United States Patent [19]

Rood et al.

[11] Patent Number: 4,515,323

[45] Date of Patent: May 7, 1985

[54] TAPE SPOOL

[75] Inventors: Robert M. Rood, Woodbury; James J. Wulfing, Afton, both of Minn.

[73] Assignee: Minnesota Mining and Manufacturing Company, St. Paul, Minn.

[21] Appl. No.: 542,415

[22] Filed: Oct. 17, 1983

[51] Int. Cl.³ ............................................. B65H 75/28
[52] U.S. Cl. .................................... 242/74.1; 242/71.8
[58] Field of Search ....................... 242/71.8, 74, 74.1, 242/74.2, 197, 199, 200; 400/238, 246

[56] References Cited

U.S. PATENT DOCUMENTS

| | | | |
|---|---|---|---|
| 3,195,828 | 7/1965 | Kuckhoff et al. | 242/74.1 |
| 3,423,038 | 1/1969 | Katzeff et al. | 242/199 |
| 3,623,586 | 11/1971 | Shellabarger | 400/246 |
| 3,640,483 | 2/1972 | Beck et al. | 242/74.1 |
| 3,826,489 | 7/1974 | Watkins, Jr. | 360/132 |
| 3,885,751 | 5/1975 | Kelch et al. | 242/74.1 |
| 4,213,578 | 7/1980 | Katata | 242/74 |

FOREIGN PATENT DOCUMENTS 2371373  6/1978  France ............................. 242/74.1

Primary Examiner—Leonard D. Christian
Attorney, Agent, or Firm—Donald M. Sell; James A. Smith; David W. Anderson

[57] ABSTRACT

A prior tape spool comprises two hub parts which are wedged together to pinch a tape leader between the walls of a narrow passage that opens through the tape-winding surface. The novel tape spool differs from the prior tape spool in that the passage pinches the leader only in a region remote from the opening through the tape-winding surface, so that if the leader is accidentally crimped or off center, it would tend to straighten out before emerging from the opening.

12 Claims, 5 Drawing Figures

U.S. Patent   May 7, 1985   Sheet 1 of 2   4,515,323
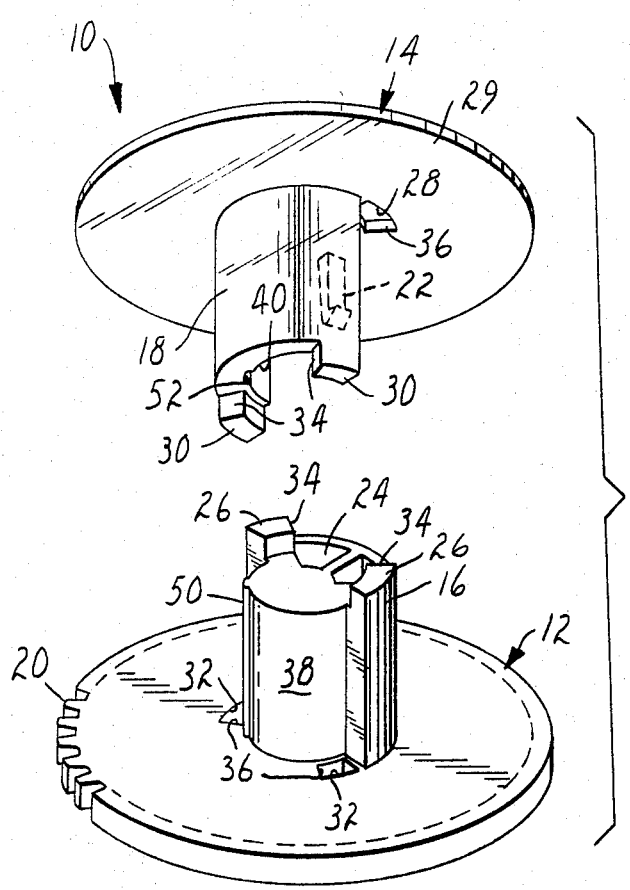
Fig.1
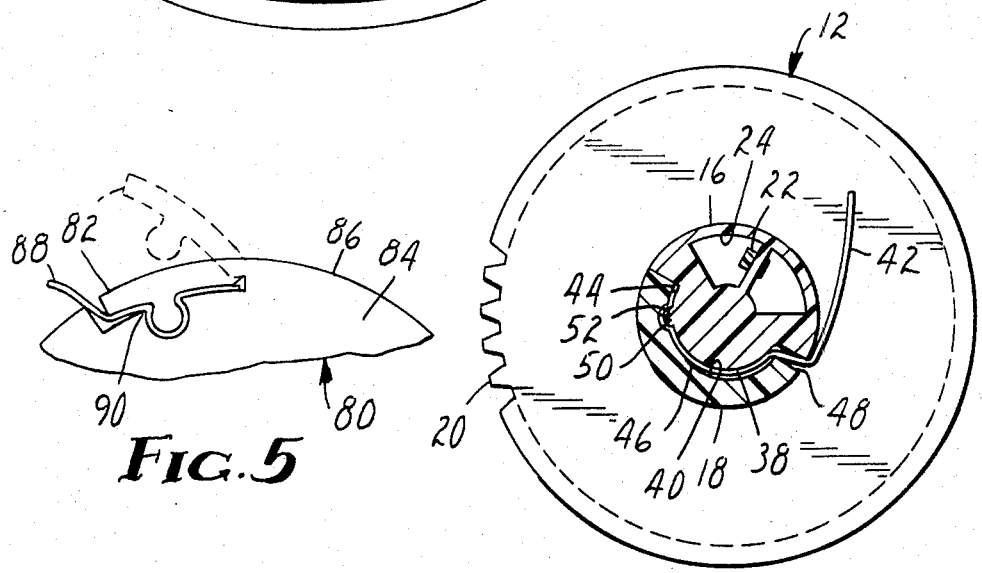
Fig.5
Fig.2

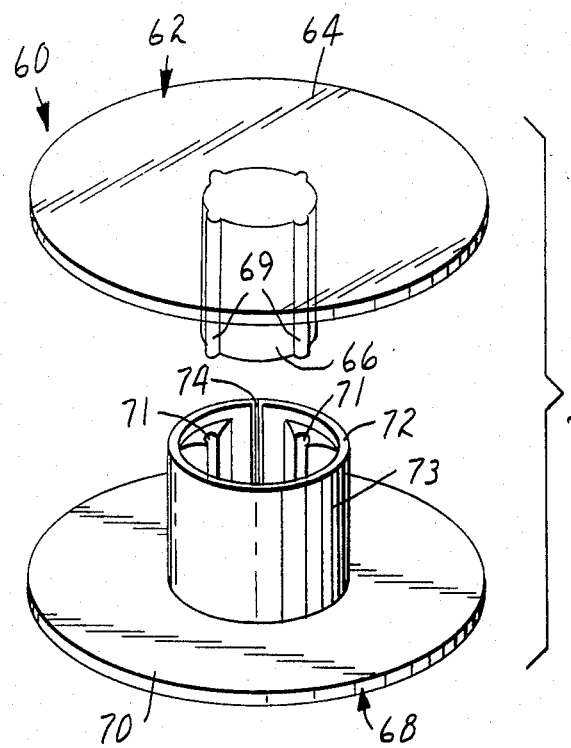
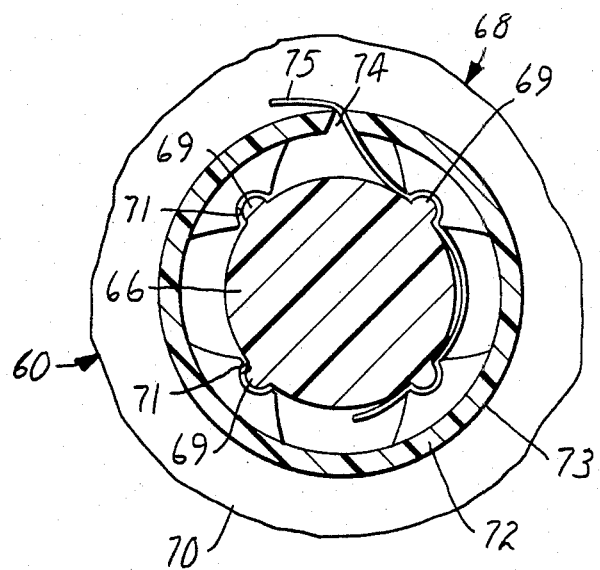

TAPE SPOOL

FIELD OF THE INVENTION

The invention concerns a tape spool having a cavity through its tape-winding surface for locking a tape member. The invention especially concerns tape spools for videotape cassettes.

BACKGROUND ART

All videotape cassettes have leaders which are permanently locked to both tape spools. Typically this is accomplished by a plastic clamp which fits into a slot in the tape-winding surface such as the locking piece 5 of FIG. 1 of U.S. Pat. No. 4,213,578. Upon driving the clamp into the slot, the leader is sometimes crimped or otherwise damaged. Even when the leader is not damaged during assembly, it sometimes comes loose when pulled. To guard against this, a metal wedge is often driven into an opening in the clamp. If the leader is off-center or misaligned where it emerges from the clamp, its edge might be folded by a flange of the spool.

U.S. Pat. No. 4,213,578 includes FIG. 1 as prior art and shows in FIG. 6 an improved clamp which would involve the same crimping problem even though it may improve resistance to leader pull-out. The patent also shows as prior art other tape clamps and how their pull-out resistance might be improved.

FIGS. 10 and 11 of U.S. Pat. No. 3,826,489 show an audiocassette tape spool comprising two identical hub parts which have mating inclined surfaces that wedge the parts together to grip the end of a tape member between radial surfaces. The assembled parts may then be secured to each other by ultrasonic or other conventional techniques.

DISCLOSURE OF THE INVENTION

The tape spool of the invention can be assembled automatically more easily than can conventional videotape cassette spools and with little danger of crimping the leader. The novel tape spool also affords exceedingly high pull-out values. Furthermore, no separate clamping or wedging piece is required, thus both reducing cost and inventory.

Like the tape spool of U.S. Pat. No. 3,826,489, the tape spool of the invention has a cylindrical tape-winding surface and comprises two hub parts, each having an interior wall and means for wedging those walls together to define a passage that opens through the tape-winding surface for pinching an end of a tape member such as a leader. The novel tape spool differs from that of the patent in that said wedging means move the walls to spacings greater than the thickness of the tape member in the vicinity of the passage opening through the tape-winding surface and less than the thickness in regions remote from that opening. Hence, even if the tape member were accidentally crimped or pinched off-center or misaligned during assembly, it would tend to straighten out in that portion of the passage where it was not being pinched so that it would emerge squarely from the center of the passage.

A leader or other tape member is not likely to be crimped during assembly of the novel tape spool, because the spacing between the walls which define the passage can be relatively large when the hub parts are first brought together around the leader, and little or no lateral movement is needed after the walls begin to pinch the leader. Generally, the walls pinch the leader along about one-half the length of the passage, and the leader is free through the other half. Preferably the length of the portion of the passage from its opening to the point at which the leader is pinched equals from $\frac{1}{4}$ to $\frac{1}{2}$ the radius of the cylindrical tape-winding surface.

In the region where the walls of an assembled tape spool pinch a leader, each of the walls preferably has small projections and indentations between which the leader is contorted and thus gripped more securely. In preferred tape spools embodying the invention, the walls of the passage are generally cylindrical and parallel to the tape-winding surface except where the passage abruptly changes to the radial direction and opens through the tape-winding surface. An abrupt change in direction enhances the pull-out resistance.

Preferably each hub part of the novel spool includes means for latching the two hub parts together such as one or more detents projecting from one part into corresponding openings in the other. Such latching means in combination with the wedging means should make it unnecessary to employ ultrasonic bonding as is commonly used in assembling videocassette tape spools.

As in the prior art, each of the hub parts may be molded plastic. In tape spools for current videocassette use, each part includes a flange, one part being opaque and the other transparent. Typical plastics for the opaque part are acetal resin and acrylonitrile-butadiene-styrene (ABS) copolymer. Typical plastics for the transparent part are styrene-acrylonitrile copolymers and polystyrene.

THE DRAWING

In the drawing

FIG. 1 schematically shows in isometric the assembly of a videocassette tape spool of the invention;

FIG. 2 is a central cross-section through the assembled tape spool of FIG. 1 with a leader in place;

FIG. 3 schematically shows in isometric the assembly of a second videocassette tape spool of the invention;

FIG. 4 is a central cross-section through the assembled tape spool of FIG. 3 with a leader in place; and FIG. 5 schematically shows a fragment of a flangeless audiocassette tape spool of the invention with a leader in place.

The tape spool 10 of FIGS. 1 and 2 consists of two interlocking parts 12 and 14, each including a semi-cylindrical tape-winding surface (16 and 18, respectively). The part 12 is opaque and has a toothed flange 20. The part 14 is transparent so that a detent 22 can be seen through its tape-winding surface 18. The detent fits through an opening 24 in the opaque part 12 to latch the transparent part 14 to the opaque part 12. During the latching, a tab 26 at each end of the semi-cylindrical surface 16 on the opaque part 12 fits into an opening (one shown at 28) in a flange 29 of the transparent part 14, and a tab 30 at each end of the semi-cylindrical surface 18 of the transparent part 14 fits into an opening 32 in the flange 20 of the opaque part. A taper 34 at the adjacent edges of each tab 26, 30 and a taper 36 at the adjacent edges of each opening 28, 32 force the generally cylindrical wall 38 of the opaque part 12 and the generally cylindrical interior wall 40 of the transparent part 14 toward each other to define a passage for a tape leader 42 as shown in FIG. 2. The semi-cylindrical walls 38, 40 pinch the leader 42 along about one-half the length of the passage from its closed end 44 to its midpoint 46, and the passage is wider than the thickness of the leader 42 from the midpoint 46 to the point 48 where the passage opens through the tape-winding surfaces 16, 18. For most of its length, the walls of the passage are generally cylindrical and parallel to the tape-winding surface 18 except at a tongue 50 and groove 52 in the walls 38, 40, respectively, and beyond a point where the passage abruptly changes to the radial direction before opening through the tape-winding surfaces 16, 18.

When the leading edges of the tapers 34 of the tabs 26, 30 first contact the tapers 36 of the openings 28, 32, the clearance between the generally cylindrical walls 38 and 40 exceeds the thickness of the leader. Upon pressing the parts 12 and 14 together, the clearance decreases until the leader begins to be pinched between the passage points 44 and 46. Since there is very little relative movement between the parts 12 and 14 after the leader is first pinched, there is very little possibility of crimping the leader or of pinching it off-center or misaligned.

The tape spool 60 of FIGS. 3 and 4 consists of a transparent part 62 which has a flange 64 and a hub 66 and an opaque part 68 which has a flange 70 and a hollow hub 72 that has a cylindrical tape-winding surface 73. A narrow slot 74 in the tape-winding surface 73 opens into the hollow of the hub 72. The hub 66 of the transparent part 62 has four tongues 69 which fit into four grooves 71 of the hollow hub 72. The tongues and grooves are tapered axially so that the clearance between them exceeds the thickness of a tape leader until the transparent hub 66 is almost completely seated in the hollow hub 72.

When a tape leader 75 is threaded through the slot 74 of the opaque part 68 and the transparent hub 66 is inserted as shown in FIG. 4, the leader is contorted between the tongues 69 and grooves 71 and so is highly resistant to pull-out. Because there is very little relative movement between the parts 62 and 68 after the leader begins to be pinched, there is little possibility of crimping the leader or forcing it off center or out of alignment. However, there is sufficient distance between the slot 74 and the nearest tongue and groove to enable the leader to be straightened out if it should be accidentally crimped or pinched off-center or misaligned.

The flangeless tape spool 80 of FIG. 5 consists of two integrally molded plastic parts, namely a hub 84 and a tape-locking part 82 which together provide a cylindrical tape-winding surface 86. The tape-locking part 82 opens to receive the end of a tape member 88 and closes to provide a passage, the thickness of which is greater than the thickness of the tape member between a midpoint 90 of the passage and its opening through the tape-winding surface, and less than the thickness of the tape member between the midpoint 90 and remote regions of the passage.

We claim:

1. Tape spool having a cylindrical tape-winding surface and comprising two hub parts, each having an interior wall and means for wedging those walls together to define a narrow passage that opens through the tape-winding surface for pinching an end of a tape member, wherein the improvement comprises:
    a flange attached to each of said hub parts and from which said hub parts perpendicularly extend;
    a semi-cylindrical tape-winding surface defining the exterior of each hub part;
    at least one tab axially aligned with each of said semi-cylindrical tape-winding surfaces;
    an opening in each flange for receiving said tab of the other hub part; and
    a taper at an edge of each tab and each opening which tab and opening tapers contact each other upon assembly of said hub parts, said contact between said tapers of said tabs and said openings providing said means for wedging said interior walls together and moving said interior walls to spacings greater than the thickness of said tape member in the vicinity of said passage opening and less than the thickness of said tape member in regions remote from said passage opening.

2. Tape spool as defined in claim 1 wherein the spacing between the walls is greater than the thickness of said tape member along approximately one-half of the length of the passage.

3. Tape spool as defined in claim 2 wherein the spacing between the walls is greater than the thickness of said tape member over a length from ¼ to ½ the radius of the tape-winding surface.

4. Tape spool as defined in claim 1 wherein each hub part includes means for latching the two hub parts together.

5. Tape spool as defined in claim 1 wherein said walls have small corresponding projections and indentations to grip a tape member more securely.

6. Tape spool as defined in claim 5 wherein each of the walls is generally cylindrical in said remote regions.

7. Tape spool as defined in claim 1 having a tab at each end of its semi-cylindrical surface and a taper at the adjacent edges of those tabs.

8. Tape spool as defined in claim 1 having a single tab at the center of each semi-cylindrical surface and a taper at each edge of each tab and opening.

9. A tape spool having a cylindrical tape-winding surface and comprising two hub parts and means for wedging said hub parts together to define a narrow passage that opens through the tape-winding surface and pinches an end of a tape member, wherein the improvement comprises:
    a tubular member defining one of said hub parts and having a generally circular interior wall, an exterior wall defining said cylindrical tape-winding surface and a slot which connects said interior and exterior walls to partially define said passage that opens through said tape-winding surface;
    a cylindrical member defining the other of said hub parts and having an exterior surface spaced from said interior surface of said tubular member, when said hub parts are wedged together, to define the remainder of said passage; and
    at least one tongue extending from said exterior surface of said cylindrical member and at least one corresponding groove in said interior wall of said tubular member, said tongue and said groove being tapered axially with respect to said tubular and said cylindrical members to progressively pinch said end of said tape member as said hub parts are wedged together.

10. A tape spool as defined in claim 9 wherein each of said hub parts includes means for latching said hub parts together.

11. A tape spool as defined in claim 9 wherein said at least one tongue extends from said interior wall of said tubular member and said groove is correspondingly located in said exterior surface of said cylindrical member.

12. A tape spool as defined in claim 11 wherein each of said hub parts includes means for latching said hub parts together.

* * * * *